US008457629B2

(12) United States Patent  
Chun et al.

(10) Patent No.: US 8,457,629 B2  
(45) Date of Patent: Jun. 4, 2013

(54) APPARATUS AND METHOD FOR PROVIDING SERVICE STATUS INFORMATION BASED ON ACCESS CLASS RESTRICTION LIST IN MOBILE COMMUNICATION SYSTEM

(75) Inventors: Young-Gun Chun, Suwon-si (KR); Byeong-Woo Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1168 days.

(21) Appl. No.: 11/832,518

(22) Filed: Aug. 1, 2007

(65) Prior Publication Data

US 2008/0045211 A1 Feb. 21, 2008

(30) Foreign Application Priority Data

Aug. 18, 2006 (KR) .................. 10-2006-0077972

(51) Int. Cl.
*H04W 4/00* (2009.01)
(52) U.S. Cl.
USPC ......... 455/434; 455/435.2; 455/410; 455/566
(58) Field of Classification Search
USPC .............. 455/434–435.3, 565, 410–411, 466, 455/566; 370/328, 331
See application file for complete search history.

(56) References Cited

U.S. PATENT DOCUMENTS

| 5,884,193 | A  | * | 3/1999 | Kaplan | 455/565 |
| 5,999,811 | A  | * | 12/1999 | Molne | 455/432.3 |
| 6,175,743 | B1 | * | 1/2001 | Alperovich et al. | 455/466 |
| 6,334,052 | B1 | * | 12/2001 | Nordstrand | 455/411 |
| 6,832,093 | B1 | * | 12/2004 | Ranta | 455/456.4 |
| 8,000,706 | B2 | * | 8/2011 | Lee et al. | 455/435.2 |
| 8,116,736 | B2 | * | 2/2012 | Dalsgaard et al. | 455/411 |
| 8,116,764 | B2 | * | 2/2012 | Moore et al. | 455/432.1 |
| 8,165,587 | B2 | * | 4/2012 | Dahlen et al. | 455/439 |
| 2003/0040314 | A1 | * | 2/2003 | Hogan et al. | 455/435 |
| 2005/0143107 | A1 |   | 6/2005 | Pattar et al. |  |
| 2006/0084443 | A1 | * | 4/2006 | Yeo et al. | 455/449 |
| 2006/0262752 | A1 | * | 11/2006 | Moore et al. | 370/331 |
| 2007/0155363 | A1 | * | 7/2007 | Rager et al. | 455/410 |
| 2009/0036098 | A1 | * | 2/2009 | Lee et al. | 455/411 |
| 2009/0036127 | A1 | * | 2/2009 | Kim | 455/435.2 |
| 2010/0227611 | A1 | * | 9/2010 | Schmidt et al. | 455/434 |
| 2011/0039559 | A1 | * | 2/2011 | Yi et al. | 455/435.2 |
| 2011/0065432 | A1 | * | 3/2011 | Iwamura | 455/434 |

FOREIGN PATENT DOCUMENTS

| CN | 1149883 | 5/1997 |
| JP | 8-317471 | 11/1996 |
| JP | 10-243467 | 9/1998 |
| JP | 2001-313699 | 11/2001 |
| JP | 2003-528506 | 9/2003 |
| JP | 2003284149 | 10/2003 |
| KR | 1019990084353 | 12/1999 |
| KR | 1020020076055 | 10/2002 |

(Continued)

*Primary Examiner* — Sharad Rampuria
(74) *Attorney, Agent, or Firm* — The Farrell Law Firm, P.C.

(57) ABSTRACT

An apparatus and method for providing service status information based on an access class restriction list in a mobile communication system. The method includes checking whether there is same information between the access class restriction list included in system information blocks that a user equipment receives from a network and access class restriction information pre-stored in the user equipment. The same information is provided when there is the same information. The same information is transmitted to a service end and/or displayed thereon.

15 Claims, 4 Drawing Sheets

FOREIGN PATENT DOCUMENTS

| | | |
|---|---|---|
| KR | 1020050079195 | 8/2005 |
| WO | WO 98/39940 | 9/1998 |
| WO | WO 00/72609 | 11/2000 |
| WO | WO 2005/064958 | 7/2005 |

\* cited by examiner

APPARATUS AND METHOD FOR PROVIDING SERVICE STATUS INFORMATION BASED ON ACCESS CLASS RESTRICTION LIST IN MOBILE COMMUNICATION SYSTEM

PRIORITY

This application claims priority under 35 U.S.C. §119 to an application filed in the Korean Intellectual Property Office on Aug. 18, 2006 and assigned Serial No. 2006-77972, the contents of which are incorporated herein by reference.

BACKGROUND OF THE INVENTION

1. Field of the Invention

The present invention generally relates to a mobile communication system, and in particular, to an apparatus and method for providing access rejection information to a Man-Machine Interface (MMI) of a User Equipment (UE), such as a mobile phone, a mobile communication terminal, a Personal Digital Assistant (PDA), a notebook computer, etc., and displaying the information when the UE is turned power-on in a suitable cell and the access of the UE to resources of the cell is not permitted in the cell where an access class restriction is set. A suitable cell, as used herein, represents a cell on which the user equipment can normally camp. The phrase camp on or variations thereof, as used herein, means that while residing in a cell, a user equipment receives a service from the cell after the user equipment connects to the cell and until the user equipment moves to another cell.

2. Description of the Related Art

A UE periodically transmits/receives information to/from a network from a moment when the UE is turned power-on to a moment when the UE is turned power-off. When the UE needs to update information, the UE transmits the updated information to the network. Likewise, when the network needs to update information, the network transmits the updated information to the UE. The UE analyzes the updated information transmitted from the network and performs the following process based on a particular scheme, such as a communication protocol.

In particular, the UE searches a cell where the UE is and, when the cell is a suitable cell, the UE camps thereon. The UE then obtains information unique to the cell and acquires location information based on the unique information. The UE also receives system information blocks that are periodically broadcasted in the cell that the UE camps on, and executes the following process based on the received system information blocks and a particular scheme.

FIG. 1 shows a conventional mobile communication system. A Radio Network Controller (RNC) and a User Equipment (UE) execute communication using Radio Resource Control (RRC) layers 110 and 120, Radio Link Control (RLC) layers 130 and 140, Medium Access Control (MAC) layers 150 and 160, and physical layers L1 170 and 180.

As described below, the UE in FIG. 1 represents a mobile communication terminal. However, the UE may be also be configured as a variety of other devices, such as mobile phone, a PDA, a notebook computer, etc.

The physical layers L1 170 and 180 are communication protocols of first layers and they correspond to electrical and mechanical interfaces for communication media. They transform data including access connection and access disconnection into signals that can be communicated among devices of the mobile communication system. The MAC layers 150 and 160 and the RLC layers 130 and 140 are communication protocols of second layers and they execute logical access, link control and error control. The RRC layers 110 and 120 are communication protocols of third layers. They exchange control messages to establish and control the physical layers L1 170 and 180, the MAC layers 150 and 160, and the RLC layers 130 and 140. A Mobility Management (MM) layer 105 is disposed on top of the RRC layer 120, and the MM layer 105 is connected with the radio network controller (RNC) or a mobile switching center (MSC) to manage a position of the UE in motion. A Man-Machine Interface (MMI) 100 communicates with the MM layer 105 to thereby display the current status of the UE, or the MMI 100 receives input data from a user and delivers the data to a lower layer.

When access class restriction information set up on an access class restriction list is the same as access class restriction information set up in a Subscriber Identity Module (SIM) card of the UE among cell restriction information included in a system information block (SIB), the RRC layer 120 of the UE reports the access class restriction information to the MM layer 105. The SIB is transmitted to the RRC layer, analyzed, and its results are transmitted to the MM layer 105.

Subsequently, when the MM layer 105 determines that the MM layer 105 cannot successfully execute registration, the MM layer 105 reports to the MMI 100 that only a limited service can be provided. Under the limited service, only an emergency call is permitted and normal calls are not permitted. When a great deal of subscribers temporarily crowd and make requests for the service that go over the capacity of a base station, the base station may limit access to the service in the cell of the base station.

However, the MMI 100 of the UE cannot receive a cause for the limited service. Since the MMI 100 does not receive information on the cause, the user cannot know whether there is a problem in the UE or in the resource distribution status of the cell.

SUMMARY OF THE INVENTION

The present invention substantially solves at least the above problems and/or disadvantages and provides at least the advantages below. Accordingly, an aspect of the present invention is to provide an apparatus and method for providing service status information based on an access class restriction list.

Another aspect of the present invention is to provide an apparatus and method for providing current cell status information to a man-machine interface, when a UE is turned power-on in a suitable cell where an access class restriction is set.

A further aspect of the present invention is to provide an apparatus and method for reporting current status of a cell to a user, when a UE is turned power-on in a suitable cell where an access class restriction is set.

According to an aspect of the present invention, in a method for providing service status information based on an access class restriction list in a mobile terminal, the method includes checking whether there is same information between an access class restriction list included in system information blocks that a UE receives from a network and access class restriction information pre-stored in the UE. The same information is provided when there is the same information. The same information is transmitted to a service end or the same information is output.

According to another aspect of the present invention, in an apparatus for providing service status information based on an access class restriction list in a mobile terminal, a cell restriction information processor checks whether there is same information between an access class restriction list included in system information blocks received from a UE and access class restriction information pre-stored in the UE. When there is the same information, the cell restriction information processor transmits the same information to a man-machine interface. Then, the man-machine interface transmits or outputs the information provided by the cell restriction information processor to a service end. A controller receives system information blocks from a network, provides the system information blocks to the cell restriction information processor, allowing the cell restriction information processor to check whether there is a restriction on access to resources within a cell, and provides the restriction information to the man-machine interface.

According to a further aspect of the present invention, in a system for providing service status information based on an access class restriction list in a mobile communication system, a network apparatus sets up access class restriction in a currently managed cell and broadcasts the system information blocks including the access class restriction when service requests are made beyond a capacity of a base station. A UE outputs the same information to provide service status information when there is the same information between an access class restriction list included in the system information blocks and access class restriction information pre-stored in the UE.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

An apparatus and method for providing service status information based on an access class restriction list in a mobile communication system will now be described.

Figure 1:
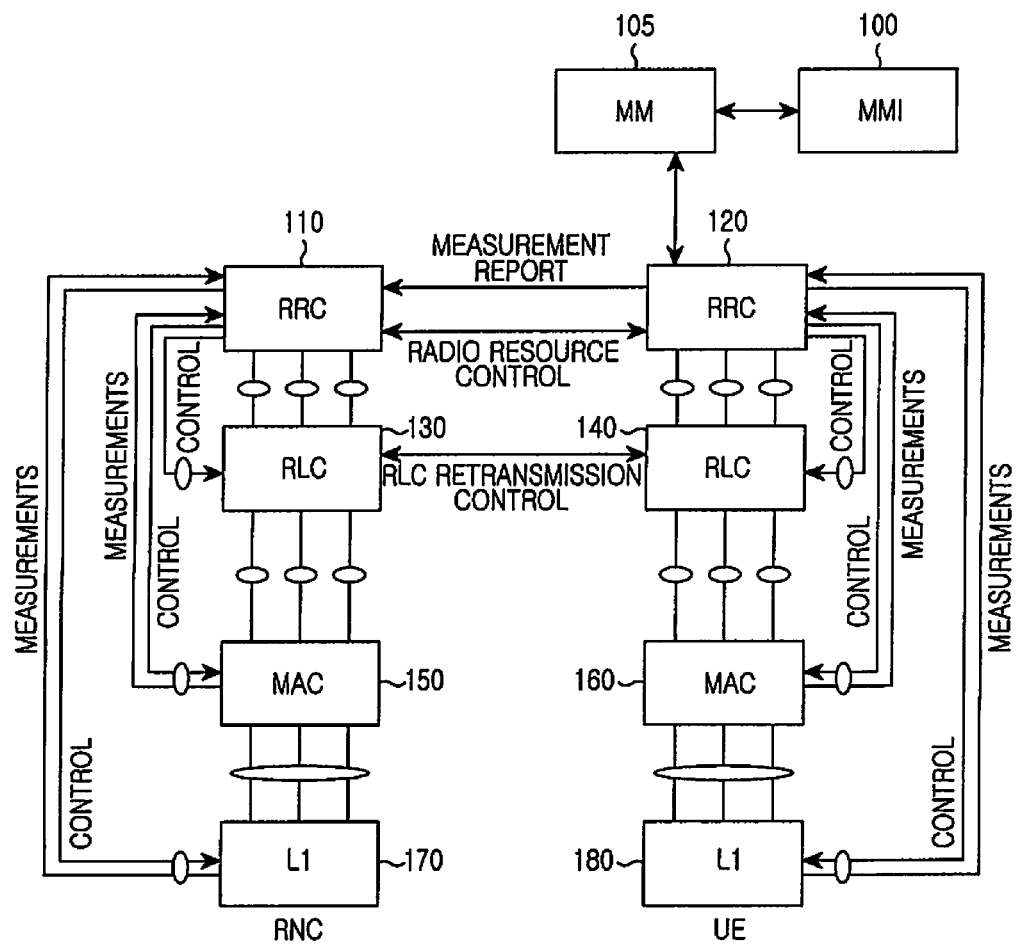
FIG. 1 is a conventional mobile communication system.
Figure 2:
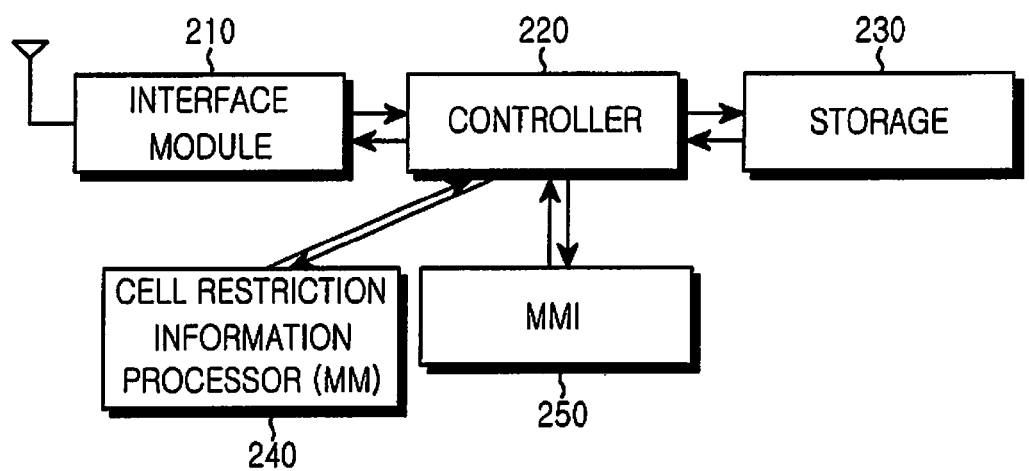
FIG. 2 is a UE according to the present invention.

FIG. 2 shows a UE according to the present invention that includes an interface module 210, a controller 220, a storage 230, a cell restriction information processor 240 and a Man-Machine Interface (MMI) 250. The controller 220 receives system information blocks from an interface module 210 and provides it to a cell restriction information processor 240. The system information blocks include access class restriction information that is periodically broadcasted in a current cell where a User Equipment (UE) camps on. The UE is described below as a mobile communication terminal. However, the UE may be also be configured as a variety of other devices, such as mobile phone, a Personal Digital Assistant (PDA), a notebook computer, etc. As previously mentioned, the phrase camp on or variations thereof, as used herein, means that while residing in a cell, a UE receives a service from the cell after the UE connects to the cell and until the UE moves to another cell. When there is information the same as the access class restriction information in a Subscriber Identity Module (SIM) card of the UE, the controller 220 makes the cell restriction information processor 240 transmit the same information to the MMI 250 to display the information.

When information the same as the access class restriction information is in the SIM card of the UE according to direction and information provided by the controller 220, the cell restriction information processor 240 provides the same information to the MMI 250 through the controller 220. The cell restriction information processor 240 may be included in a Mobility Management (MM) layer.

The MMI 250 performs a role of an interface between a user and the UE. In particular, when the MMI 250 receives the access class restriction information from the cell restriction information processor 240, the MMI 250 provides the access class restriction information to the functional modules in charge of services, such as a voice communication service, a data communication service, a Short Message Service (SMS), etc., to display whether a service is restricted or not. When the MMI 250 receives the service restriction information, the MMI 250 may display the information instantly.

A storage 230 stores a program for controlling the general operation of the UE and temporary data that are created during execution of the program. The storage 230 may include the SIM card.

The interface module 210 is a module for communication with other nodes and it includes a Radio Frequency (RF) processor and a baseband processor. The RF processor transforms signals received through an antenna into baseband signals and provides the baseband signals to the baseband processor. The RF processor also transforms baseband signals transmitted from the baseband processor into RF signals, which can be transmitted in the air, and transmits the RF signals through the antenna.

The controller 220 may perform the functions of the cell restriction information processor 240 and the MMI 250. However, functions of the cell restriction information processor 240 and the MMI 250 are presented individually here to distinctively describe each function. In any event, the controller 220 may be configured to perform the functions of the cell restriction information processor 240 and/or the MMI 250, or to perform only part of the functions.

Figure 3:
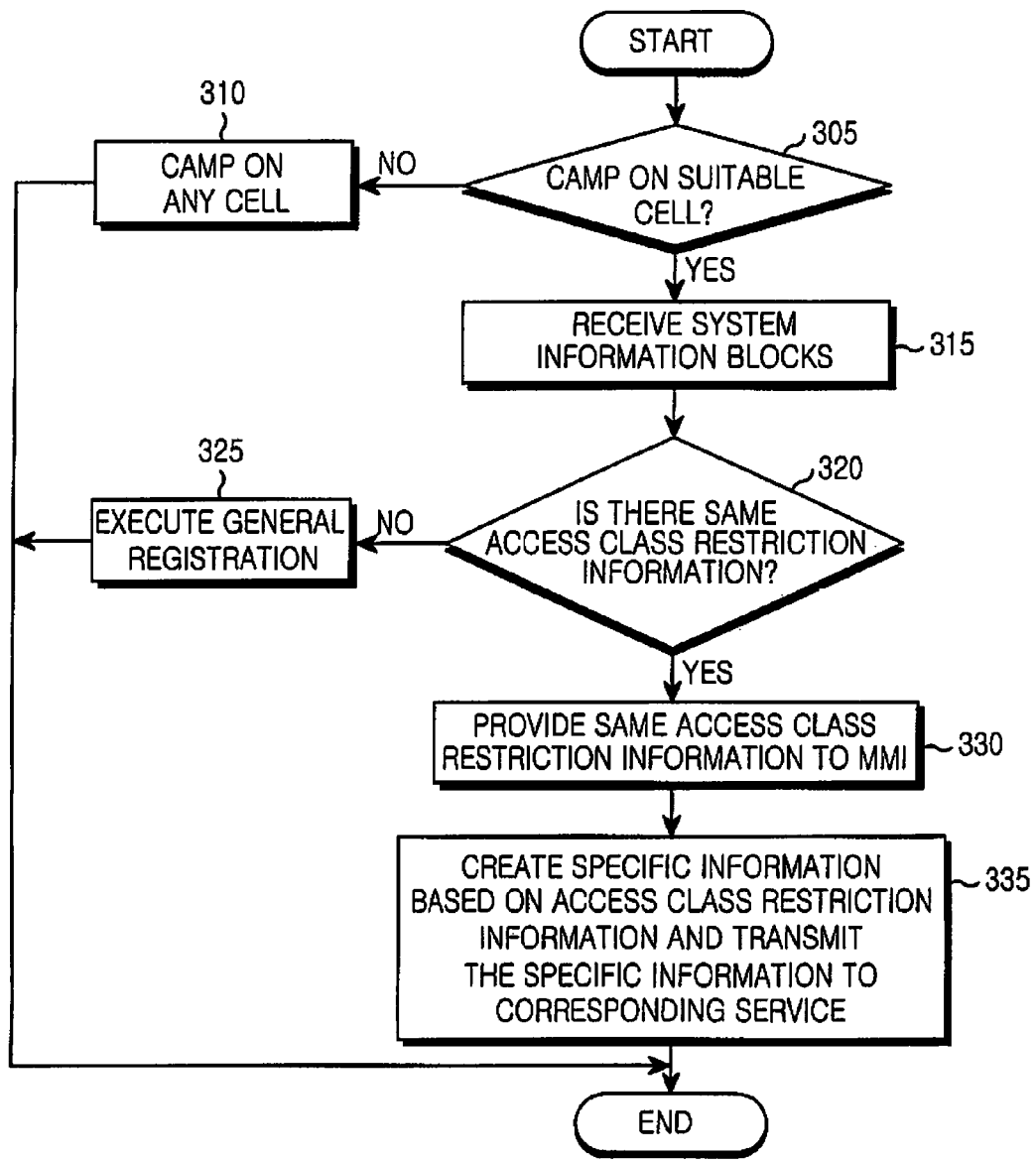
FIG. 3 is a flowchart of a process of providing a service status information based on an access class restriction list according to the present invention.

FIG. 3 shows a process of providing a service status information based on an access class restriction list according to the present invention.

In FIG. 3, when a UE is turned power-on, a controller of the UE controls a lower physical layer to scan radio frequency to search for a cell on which the UE can camp in a current position in step 305.

When a suitable cell that the UE can camp on is not searched in step 305, the UE camps on any cell in step 310. Any cell, as used herein, refers to a cell on which the UE can camp.

When a suitable cell is searched and on which the UE camps in step 305, the controller acquires system information blocks by analyzing a broadcast channel (BCH) including system information blocks that inform the current status of the cell in step 315.

In step 320, the controller controls a cell restriction information processor to check whether there is information the same as information stored in a SIM card on an access class restriction list of the system information blocks.

When there is no information that is the same as the information stored in the SIM card, the controller executes a general registration in step 325.

Figure 4:
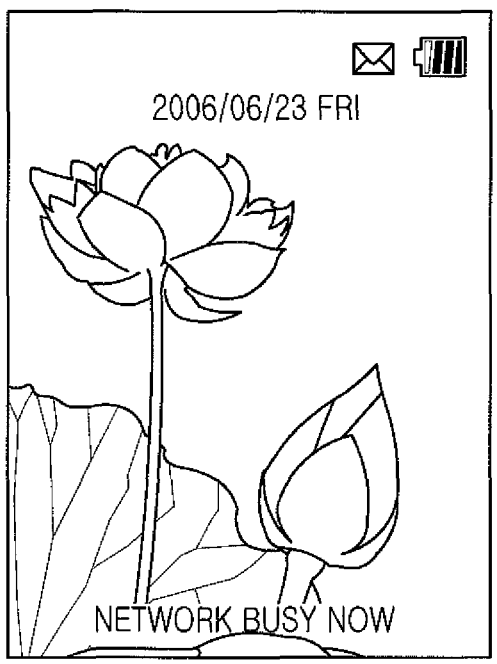
FIG. 4 shows a service status information on a screen according to the present invention.

When there is information that is the same as the information stored in the SIM card, the controller provides the same information to an MMI in step 330. Subsequently, the MMI transmits the same information, which is access class restriction information, to a functional module of a service, such as a voice communication service, a data communication service, an SMS, etc., to display whether a service is restricted upon receipt of a request for the service, which is shown in FIG. 4.

In step 335, the MMI may display the same information instantly, when it receives the same information from the cell restriction information processor. When a user selects a service, such as a voice communication service, a data communication service, an SMS, etc., the MMI may also display the same information. Subsequently, the process according to the present invention is terminated.

Since a cause for a restricted service is provided to the MMI and displayed according to the present invention, there is an advantage in that a user can accurately figure out why a service is not provided when the UE cannot receive the service.

Alternate embodiments of the present invention can also include computer readable codes on a computer readable medium. A computer readable medium includes any data storage device that can store data that can be read by a computer system. Examples of a computer readable medium include magnetic storage media (such as ROM, floppy disks, and hard disks, among others), optical recording media (such as CD-ROMs, DVDs, etc.), and storage mechanisms, such as carrier waves or the like (such as transmission through the Internet). A computer readable medium can also be distributed over network coupled computer systems so that the computer readable code is stored and executed in a distributed fashion. Also, functional programs, codes, code segments, etc., for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for providing service status information based on an access class restriction list in a mobile terminal, the method comprising the steps of:
   receiving, at the mobile terminal, a system information block for providing a current status of a connected cell;
   acquiring a first access class restriction list from the received system information block;
   checking the first access class restriction list included in the system information block with a second access class restriction information stored in the mobile terminal; and
   displaying, on the mobile terminal, a service that is restricted in the cell based on the check result.

2. The method of claim 1, wherein the service is at least one of a voice communication service, a data communication service and a short message service (SMS).

3. The method of claim 1, wherein the second access class restriction information is stored in a Subscriber Identity Module (SIM) card of the mobile terminal.

4. The method of claim 1, wherein the system information block is received from a broadcasting channel of the connected cell.

5. The method of claim 1, wherein the step of displaying, on the mobile terminal, a service that is restricted in the cell based on the check result is performed when the first access class restriction list matches the second access class restriction information.

6. An apparatus for providing service status information based on an access class restriction list in a mobile terminal, the apparatus comprising:
   a controller for receiving a system information block for providing a current status of a connected cell and acquiring a first access class restriction list from the received system information block;
   a cell restriction information processor for checking the first access class restriction list included in the system information block with a second access class restriction information stored in the mobile terminal and for outputting the check result; and
   a man-machine interface for displaying a service that is restricted in the cell based on the check result.

7. The apparatus of claim 6, wherein the service is at least one of a voice communication service, a data communication service and a short message service (SMS).

8. The apparatus of claim 6, wherein the second access class restriction information is stored in a Subscriber Identity Module (SIM) card of the mobile terminal.

9. The apparatus of claim 6, wherein the system information block is received from a broadcasting channel of the connected cell.

10. The apparatus of claim 6, wherein the man-machine interface displays the service that is restricted in the cell based on the check result when the first access class restriction list matches the second access class restriction information.

11. A non-transitory computer-readable recording medium having recorded thereon a program for providing service status information based on an access class restriction list in a mobile terminal, the program comprising;
   a first code segment for receiving a system information block for providing a current status of a connected cell;
   a second code segment for acquiring a first access class restriction list from the received system information block;
   a third code segment for checking the first access class restriction list included in the system information block with a second access class restriction information stored in the mobile terminal; and
   a fifth code segment for displaying a service that is restricted in the cell based on the check result.

12. The non-transitory computer-readable recording medium of claim 11, wherein the service is at least one of a voice communication service, a data communication service and a short message service (SMS).

13. The non-transitory computer-readable recording medium of claim 11, wherein the second access class restriction information is stored in a Subscriber Identity Module (SIM) card of the mobile terminal.

14. The non-transitory computer-readable recording medium of claim 11, wherein the system information block is received from a broadcasting channel of the connected cell.

15. The non-transitory computer-readable recording medium of claim 11, wherein the first code segment performed when the first access class restriction list matches the second access class restriction information.

* * * * *